United States Patent [19]
Meek et al.

[11] Patent Number: 6,121,924
[45] Date of Patent: Sep. 19, 2000

[54] METHOD AND SYSTEM FOR PROVIDING NAVIGATION SYSTEMS WITH UPDATED GEOGRAPHIC DATA

[75] Inventors: James A. Meek, Palatine; Paul Crowley, Buffalo Grove; Paul M. Bouzide, Chicago, all of Ill.

[73] Assignee: Navigation Technologies Corporation, Rosemont, Ill.

[21] Appl. No.: 09/000,570

[22] Filed: Dec. 30, 1997

[51] Int. Cl.$^7$ .............................. H04B 7/185; G01S 5/02
[52] U.S. Cl. .................... 342/357.13; 701/208; 701/210; 340/995
[58] Field of Search ....................... 342/357.13; 701/208, 701/209, 210, 212; 340/990, 995

[56] References Cited

U.S. PATENT DOCUMENTS

| | | |
|---|---|---|
| 5,367,685 | 11/1994 | Gosling . |
| 5,944,768 | 8/1999 | Ito et al. .................................. 701/200 |
| 5,951,620 | 9/1999 | Ahrens et al. ........................... 701/200 |

*Primary Examiner*—Theodore M. Blum
*Attorney, Agent, or Firm*—Frank J. Kozak; Lawrence M. Kaplan

[57] ABSTRACT

A system and method for providing updated geographic data for use by a navigation application program. The navigation application program is at a first version level and uses geographic data in a geographic database. An updated geographic database is provided to the navigation application program. The updated geographic database is at a second version level which is later than the first version level. Also provided to the navigation application program are one or more replacement routines. These replacement routines may be stored with the updated geographic database on a computer-readable medium or may be provided separately. The one or more replacement routines are used by the navigation application program either at initialization or during runtime. The one or more replacement routines are called to access or use the data in the updated geographic database. The one or more replacement routines are preferably in an interpretive language and executed by a virtual processor. The virtual processor may be part of the navigation application program. The one or more replacement routines can be used by the navigation application program thereby enabling the navigation application program which is at the first version level to use the updated geographic data which is at second version level.

22 Claims, 8 Drawing Sheets

Microfiche Appendix Included
(1 Microfiche, 51 Pages)

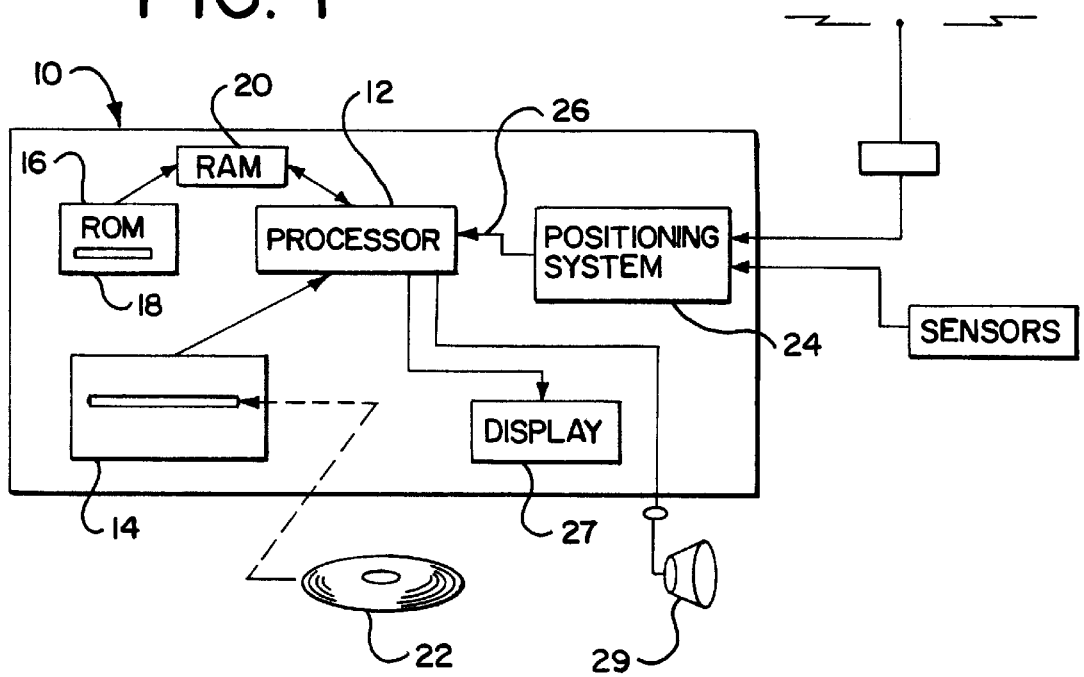
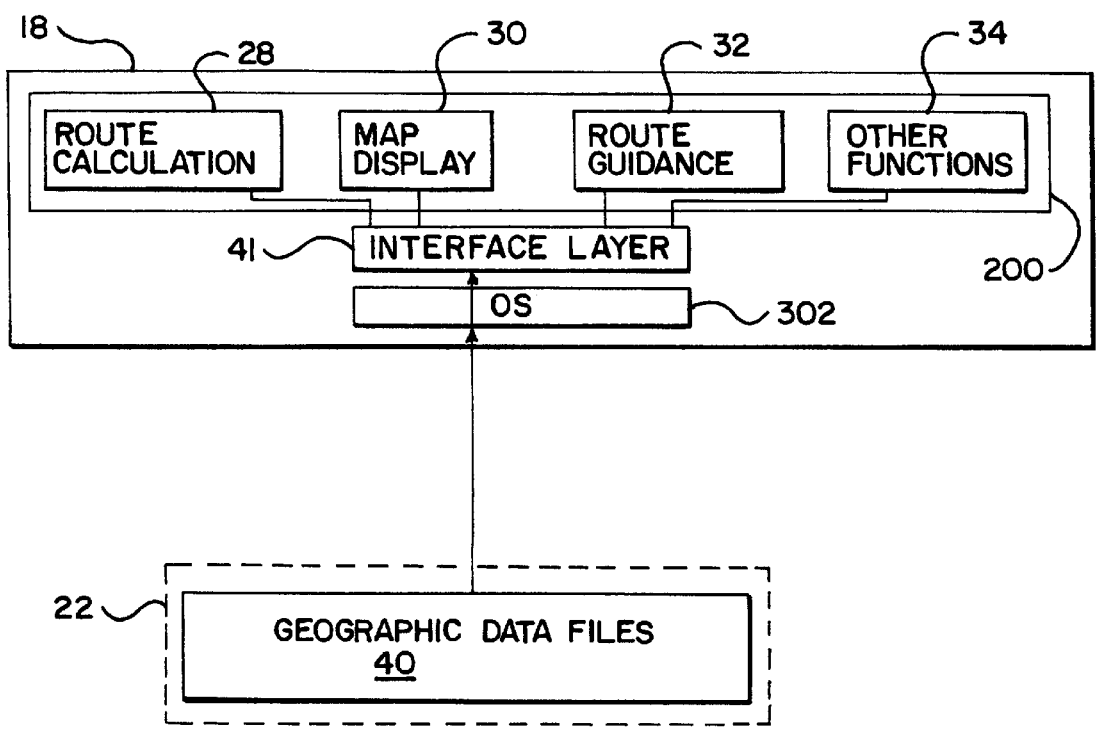

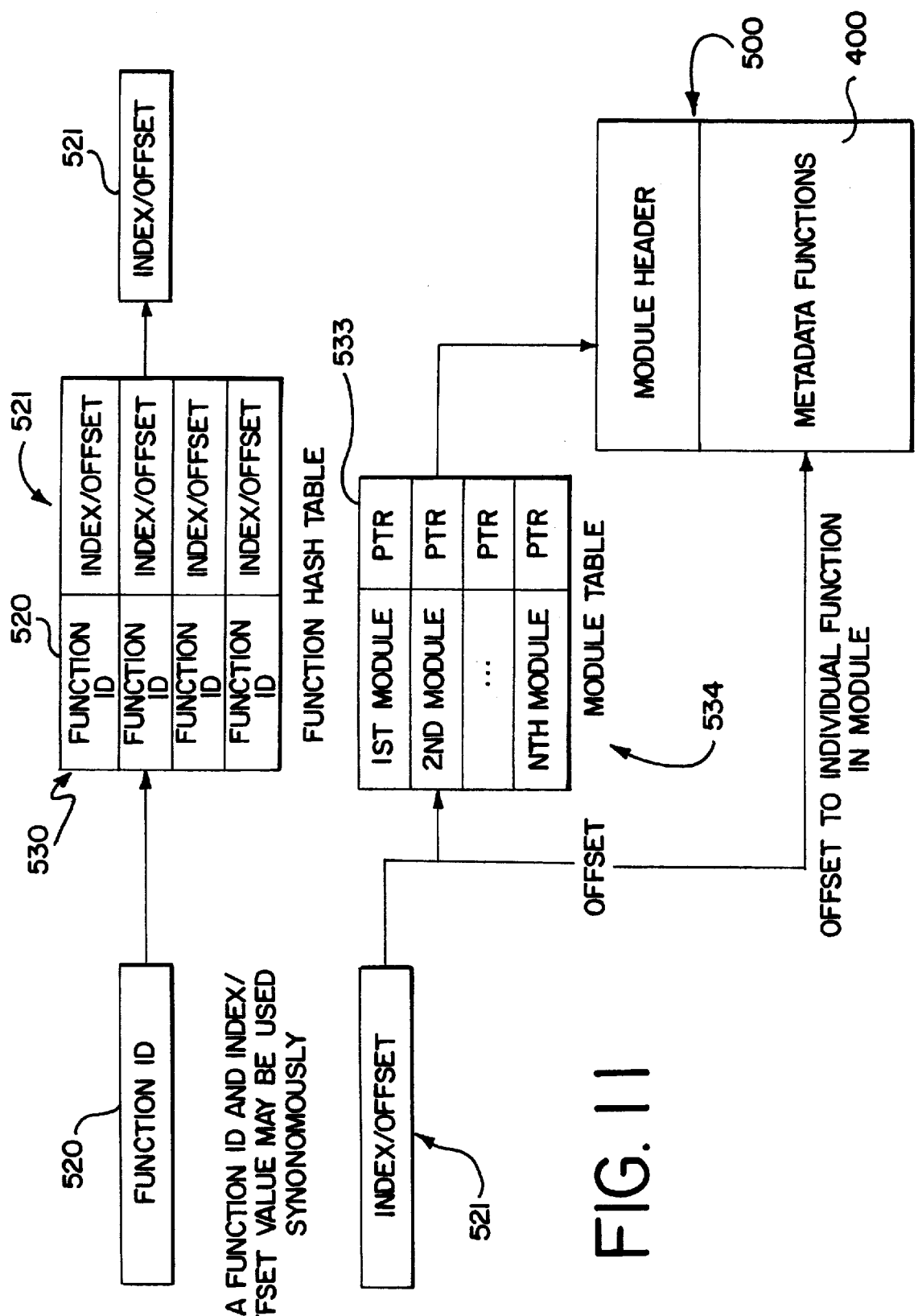

METHOD AND SYSTEM FOR PROVIDING NAVIGATION SYSTEMS WITH UPDATED GEOGRAPHIC DATA

REFERENCE TO MICROFICHE APPENDIX

Included with and forming part of this specification is a microfiche appendix, including 1 sheet of 51 total frames. Also included is a second appendix, APPENDIX B, printed immediately preceding the claims.

REFERENCE TO COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to a system and method for providing operating and/or upgrading geographic data for use with navigation application programs used in navigation systems.

Computer-based navigation application programs are available that provide end-users with various navigating functions and features. For example, some navigation application programs are able to determine an optimum route to travel by roads between locations. Using input from an end-user, and optionally from equipment that can determine one's physical location (such as a GPS system), a navigation application program can examine various routes between two locations to determine an optimum route to travel from a starting location to a destination location in a geographic region. The navigation application program may then provide the end-user with information about the optimum route in the form of instructions that identify the maneuvers required to be taken by the end-user to travel from the starting location to the destination location. If the navigation system is located in an automobile, the instructions may take the form of audio instructions that are provided along the way as the end-user is traveling the route. Some navigation application programs are able to show detailed maps on computer displays outlining routes to destinations, the types of maneuvers to be taken at various locations along the routes, locations of certain types of features, and so on.

In order to provide these and other navigating functions, the navigation application program requires one or more detailed databases that include data which represent physical features in a geographic region. The detailed database may include data representing the roads and intersections in a geographic region and also may include information about the roads and intersections in a geographic region, such as turn restrictions at intersections, speed limits along the roads, the locations of stop signs, street names of the various roads, address ranges along the various roads, and so on. Further, the geographic data may include information about points-of-interest. Presently, the collection of such geographic data and the provision of such data in a computer-usable format are provided by Navigation Technologies of Sunnyvale, Calif.

In order to provide these and other useful and enhanced features in a navigation system, there is a need to gather and organize comprehensive, detailed, reliable, and up-to-date data about geographical regions. There is also a need to continuously update the geographic data. Just like conventional printed maps, geographic data used in computer-based navigation systems can become out-of-date. For example, new roads are built, businesses change locations, road construction closes roads, detours are established, museum and restaurant hours change, etc. It is expected that end-users, such as vehicle owners who have navigation systems in their vehicles, will want to have the geographic data content in their navigation systems updated from time to time.

There are presently a number of different, incompatible navigation system platforms. It is expected that the number of different platforms will increase in years to come as navigation systems become more powerful and include even more features. This proliferation of different, incompatible navigation system platforms presents an obstacle to providing updated geographic data content for end-users, i.e. the persons and businesses who already have navigation systems. In order to provide updated geographic data content for end-users' navigation systems over the lifetimes of the navigation systems, the provider of geographic data needs to provide products that not only have updated geographic data content, but also that are compatible with the many end-users' particular navigation systems. Over the expected lifetimes of navigation systems, which may be ten years or more, this could require supporting a growing number of old, incompatible navigation system platforms. If specialized versions of geographic data products with updated content were produced for each separate, different type and version of navigation platform, the number of such different products would increase dramatically over time thereby making the provision of geographic data products with updated content to end-users difficult and expensive.

Accordingly, it is an object of the present invention to provide a solution to the problem of providing updated geographic data content for a variety of hardware platforms.

Further, it is an object of the present invention to provide an improved navigation system and geographic database(s) for use therein that can be efficiently developed, manufactured, customized, distributed, and/or updated across a variety of navigation system platforms, operating systems, and releases.

SUMMARY OF THE INVENTION

To address the above concerns, according to one aspect of the present invention, there is provided a system and method for providing updated geographic data for use by a navigation application program. The navigation application program is at a first version level and uses geographic data in a geographic database. An updated geographic database is provided to the navigation application program. The updated geographic database is at a second version level which is later than the first version level. Also provided to the navigation application program are one or more replacement routines. These replacement routines may be stored with the updated geographic database on a computer-readable medium or may be provided separately. The one or more replacement routines are used by the navigation application program either at initialization or during runtime. The one or more replacement routines are called to access or use the data in the updated geographic database. The one or more replacement routines are preferably in an interpretive language and executed by a virtual processor. The virtual processor may be part of the navigation application program. The one or more replacement routines can be used by the navigation application program thereby enabling the navigation application program which is at the first version level to use the updated geographic data which is at second version level.

According to a further aspect, a computer readable data product includes updated geographic data and replacement routines. The replacement routines can be called by navigation application programs having a version level which is earlier than the version level of the geographic data on the product. The replacement routines substitute for portions of the native code of the navigation application program and are used to access or use the updated geographic data on the data product.

BRIEF DESCRIPTION OF THE DRAWINGS

FIG. 1 is a block diagram of a navigation system.

FIG. 2 is a block diagram of the software components in the navigation system of FIG. 1.

FIG. 11 is a block diagram illustrating a way in which to use the version/level table, the level/module table, and the module locations on medium.

DETAILED DESCRIPTION OF THE PRESENTLY PREFERRED EMBODIMENTS

1. General

A. Overview of Navigation System

Figure 3:
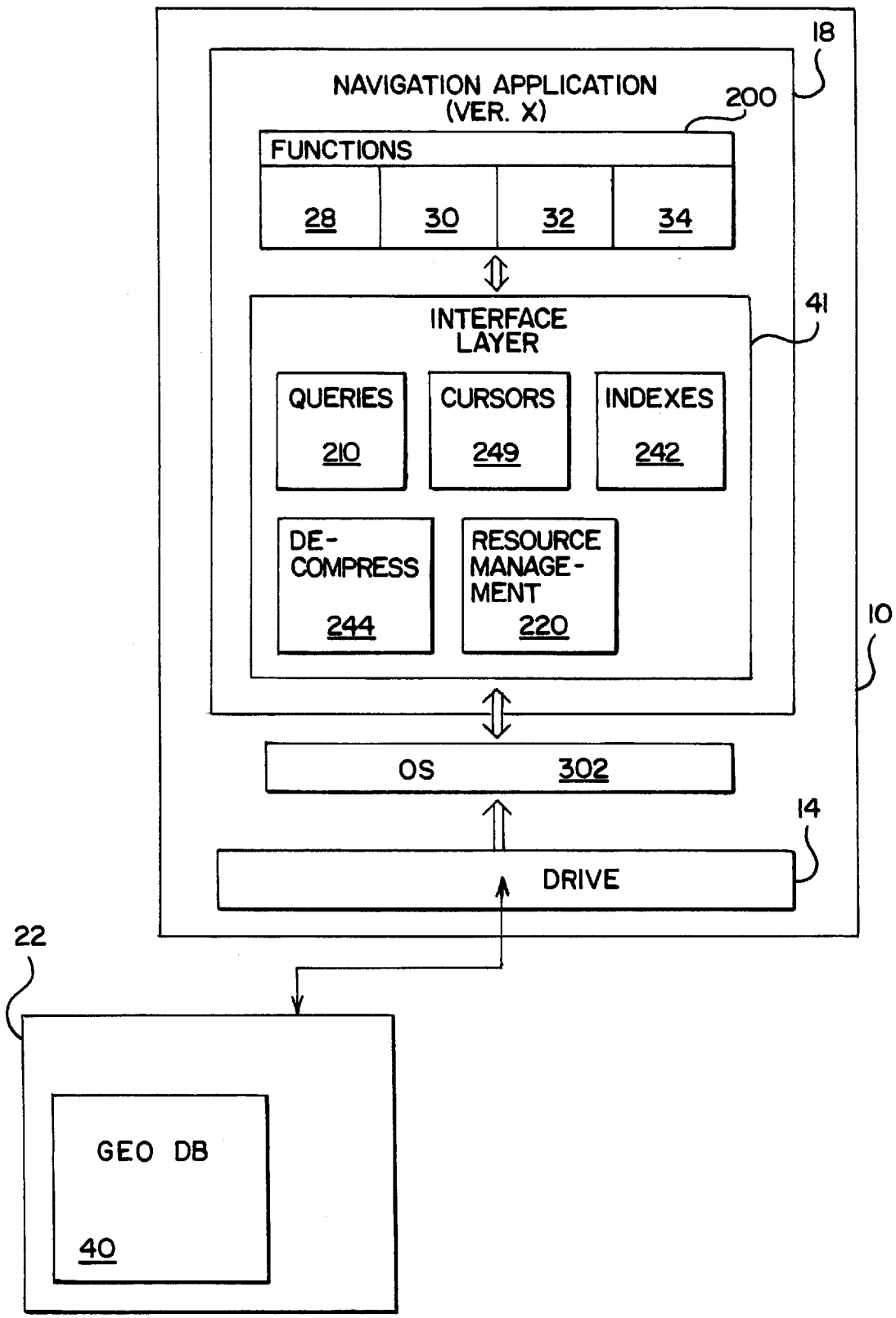
FIG. 3 is a block diagram illustrating in additional detail the software components of the navigation system of FIG. 1 and the geographic database on the storage medium.

A first embodiment of the present invention is described in connection with a portable navigation system, such as a navigation system installed in a vehicle. Embodiments may be used in other environments and platforms, as described below. The disclosed embodiments provide "forward compatibility." By "forward compatibility" it is meant that a navigation application program in a navigation system platform designed to operate with a geographic database at a particular version level is able to use a subsequently-produced geographic database at a later version level.

Referring to FIG. 1, there is a diagram illustrating an exemplary embodiment of a navigation system 10. The navigation system 10 is a combination of hardware and software components. In one embodiment, the navigation system 10 includes a processor 12, a drive 14 connected to the processor 12, and a memory storage device 16, such as a ROM, for storing a navigation application software program 18. The navigation application software program 18 is loaded from the ROM 16 into a memory 20 associated with the processor 12 in order to operate the navigation system. The processor 12 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable. A storage medium 22 is installed in the drive 14. In one present embodiment, the storage medium 22 is a CD-ROM disc. In an alternative embodiment, the storage medium 22 may be a PCMCIA card in which case the drive 14 would be substituted with a PCMCIA slot. Various other storage media may be used, including fixed or hard disks, DDVD (digital video disks) or other currently available storage media, as well as storage media that may be developed in the future. The storage medium 22 includes geographic data, as described below.

The navigation system 10 may also include a positioning system 24. The positioning system 24 may utilize GPS-type technology, a dead reckoning-type system, or combinations of these, or other systems, all of which are known in the art. The positioning system 24 outputs a signal 26 to the processor 12. The signal 26 may be used by the navigation application software 18 that is run on the processor 12 to determine the location, direction, speed, etc., of the navigation system 10.

The navigation system 10 uses the geographic data stored on the storage medium 22, possibly in conjunction with the output 26 from the positioning system 24, to provide various navigation application features and functions. These navigation application features and functions may include route calculation, map display, vehicle positioning (e.g. map matching), route guidance (wherein detailed directions are provided for reaching a desired destination), and other features. Referring to FIG. 2, the navigation application software program 18 includes separate applications (or subprograms) 200 that provide these various navigation functions. These subprograms or applications 200 include a route calculation function 28, a route guidance function 32, a map display function 30, and other functions 34 which may include vehicle positioning, destination resolution capabilities, and so on. Although FIG. 2 shows these as separate functions or subprograms within the navigation application software program 18, these functions may be combined and provided as a single program. The navigation features are provided to the end-user (e.g., the vehicle driver) by means of a display 27, speakers 29, or other means.

In FIG. 2, the storage medium 22 is shown to have geographic data 40 stored on it. The geographic data 40 are in the form of one or more computer-readable data files or databases. The geographic data 40 may include information about the positions of roads and intersections in or related to a specific geographic regional area, and may also include information about one-way streets, turn restrictions, street addresses, alternative routes, hotels, restaurants, museums, stadiums, offices, automobile dealerships, auto repair shops, etc. The geographic data 40 may be organized in a format and stored on the storage medium 22 in a manner that facilitates storage, use and access by the navigation application program 18.

B. Interface Layer

The navigation application program 18 accesses and reads portions of the geographic data 40 from the storage medium 22 in order to provide useful navigation features to the end-user of the navigation system 10. In one embodiment, the navigation application program 18 includes a data access interface layer 41. The data access interface layer 41 is a software component in the form of a library of software functions that resides in the navigation system 10. The data access interface layer 41 is located between the various navigation applications 200 (such as the functions 28, 30, 32, and 34) and the geographic database 40.

The data access interface layer 41 isolates the functions 200 of the navigation application software 18 from the size, complexity, formatting, storage, evolution, and other details of the geographic map database 40 on the physical medium 22. Copies of the data access interface layer 41 are incorporated into the navigation application software programs of navigation systems of OEM's (original equipment manufacturers) or aftermarket automotive navigation systems which use a separately stored geographic database. Similar or identical data access interface layers can be used in different navigation system platforms. i.e., the data access interface layer 41 is therefore portable across different hardware platforms. The data access interface layer 41 therefore allows various different navigation system platforms to use a common geographic database product, i.e. the geographic database 40 stored on the storage medium 22. In addition, the data access interface layer 41 may be used to facilitate the updating of the geographic data in the navigation system by the end-user of the system, as described further below.

In one embodiment, at least a portion of the data access interface layer 41 is statically-linked or compiled into the executable module that forms the navigation application software 18 in the navigation system 10 and that is loaded into the memory 20 (FIG. 1) from the ROM 16 when the navigation system 10 is operated. In a preferred embodiment, this library of functions that forms the interface layer 41 is written in the C programming language, although in alternate embodiments, other languages may be used. Embodiments of interface layers for use in navigation systems are described in the application Ser. No. 08/740, 298, which is incorporated by reference herein.

Referring to FIG. 3, the library of functions that forms the data access interface layer 41 may be organized into several subsystem or components. There are internal interfaces between these subsystem components and external interfaces to the navigation application components 200 and the operating system 302 of the navigation system 10. Data are presented to the navigation application functions 200 as logical data model ("LDM") entities. The LDM entity records are preferably of fixed length and may contain decompressed data without any cross-reference information.

The functions in the interface layer in general involve access and use of the data 40 on the medium 22. For example, one group of functions 244 provided by the interface layer 41 unpack or otherwise decompress the data on the storage medium (which may be stored as packed, optimized data entities) and transform the data into one or more LDM data entities that are returned to the requesting function among the navigation components 200. In addition, the interface layer provides various other groups of functions, including functions 242 for the management of indexes located on the medium, functions 249 that provide for and manage cursors for queries that return a plurality of records, functions 210 that manage queries from the navigation application functions, functions 220 that manage the interface layer memory resources, and so on. For purposes of this disclosure, it is not necessary to describe the details of the various groups of routines and functions within the interface layer 41.

2. Embodiment of Metadata System

A. Overview

As mentioned above, it can be expected that content of the geographic data originally provided with a navigation system will become out-of-date and that the end-user will want to have the geographic data content updated. It can also be expected that over the years, navigation system platforms will evolve and improve. As a result of the expected evolution and development of improved navigation systems, it is possible that changes may be required in the structure and arrangement of geographic data on the storage media used with these new navigation systems. It would be preferred that end-users of older navigation systems who want to obtain updated geographic data content be able to use a geographic database product with the updated geographic data content provided in the same updated format used by newer navigation system platforms. This would avoid the need to manufacture multiple versions of updated geographic content in different formats for different, possibly obsolete, navigation platforms. Accordingly, the embodiments disclosed herein provide a means for end-users of older navigation systems to access and use geographic data provided in newer formats.

Figure 4:
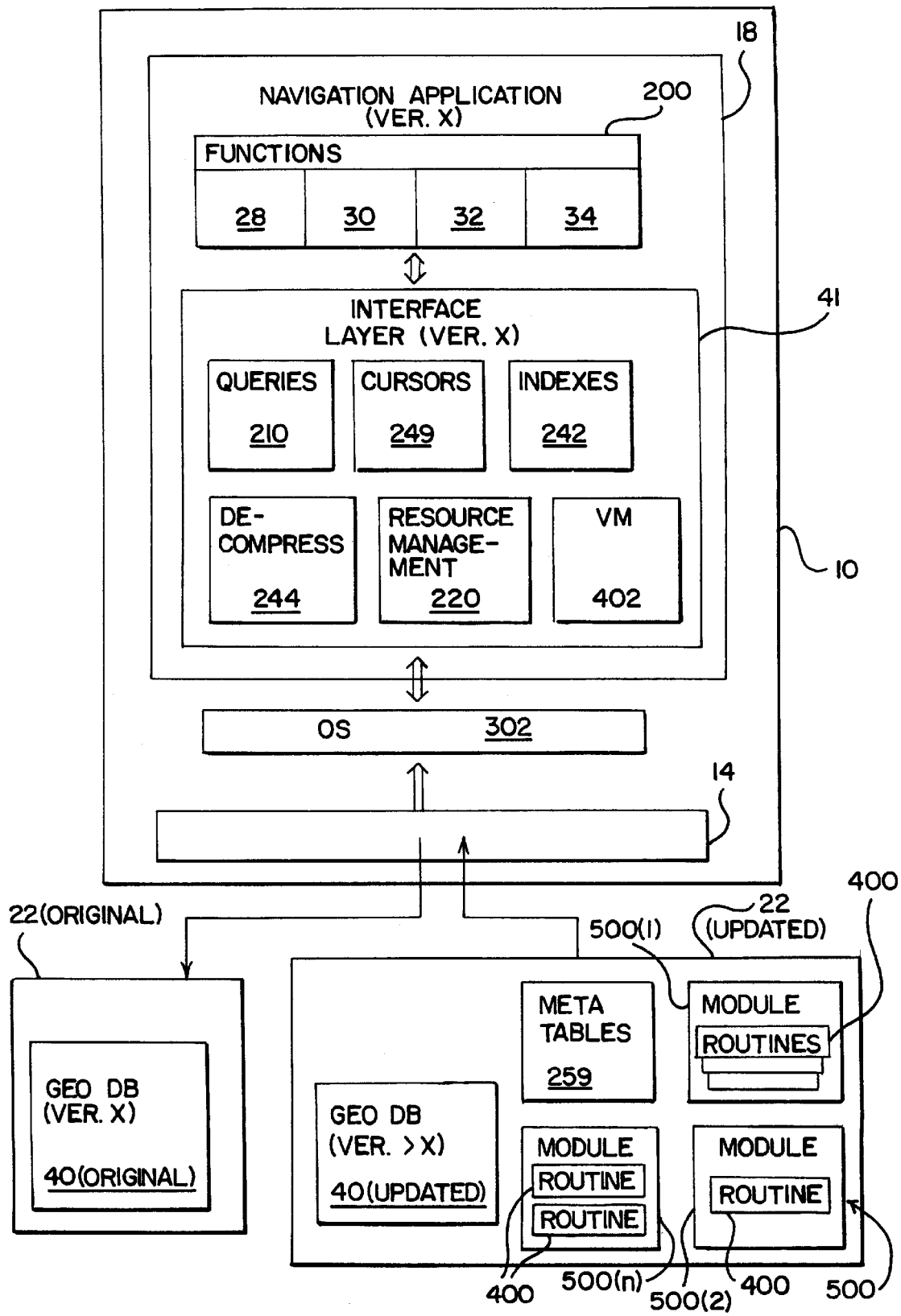
FIG. 4 is a block diagram similar to that of FIG. 3 illustrating the software components of the navigation system of FIG. 1 and the replacement of a first storage medium with a geographic database with a second medium with an updated geographic database.

Referring to FIG. 4, there is illustrated a block diagram similar to the block diagram of FIG. 3. In FIG. 4, two media are shown. The medium 22(original) corresponds to the medium 22 in FIG. 3 and the medium 22(updated) corresponds to an updated or replacement medium. The navigation application 18 has a version level X (e.g. 2.0) which includes the necessary programming to access and use the geographic database 40(original) of a corresponding version level X (e.g. 2.0). (The version level of the navigation application program 18 may be the same as or derive from the version level of the interface layer 41, if one is provided, since the interface layer 41 includes the primary functionality to access the geographic data.) According to one embodiment, an updated geographic database 40(updated) which is at a version level>X (i.e. later than the version level X) can be provided to the navigation system 10 by removing the medium 22(original) upon which is stored the original geographic database 40(originial), and replacing it with the new medium 22(updated) upon which is stored a new geographic database 40(updated). The new geographic database 40(updated) not only includes updated content, but may be organized and arranged in an updated way and may include new types of data which the navigation application 18 was not designed to access or use.

(In an embodiment in which the geographic database is stored on a read-only medium, such as a CD-ROM disc, the original medium is removed from the CD-ROM drive bay and replaced with the new CD-ROM disc. In alternative embodiments, other types of media may be used, including re-writable media, such as PCMCIA cards. With a re-writable medium, the medium may not be physically replaced. Instead, the original geographic database stored on the medium may be written over with the new geographic database, e.g. 40(updated). In still further alternative embodiments, the original geographic database may not be replaced entirely, but instead an incremental update file may be provided. The incremental update file is used to replace only portions of the original geographic database. Reference is made to the incremental update file during initialization or runtime to selectively substitute the updated data for the original data when updated data are available. These types of systems are considered to be encompassed within the types of systems to which embodiments of the present invention are applicable.)

One way to account for new types of data or changes in the geographic database structure or format is through the use of one or more metadata tables 259. A metadata table may be stored on the medium 22(updated) along with the new version of the geographic database 40(updated). The term "metadata table" is used to refer to a table that includes data about data and in this context is used to describe a table provided on the medium with the updated geographic data that provides for the translation of the geographic data stored on the medium at a second version level (i.e. the updated geographic data) into geographic data at a first version level (i.e. a version earlier than the second version level) so that a navigation program which was designed to use geographic data at the first version level can use the geographic data at the second version level. Metadata tables may be used to provide forward compatibility to account for many of the kinds of changes that can occur in the geographic database.

In some situations, metadata tables 259 may not be able to account for the types and scope of chances in the structure or format of the updated geographic database. Under such circumstances another way to provide for forward compatibility is to use replacement routines. In one embodiment, the replacement routines are provided on the same medium 22(updated) upon which the updated geographic data 40(updated) are stored. Replacement routines may be preferred or required under many circumstances instead of metadata tables, as explained below.

Referring to FIG. 4, one or more replacement routines 400 are included in one or more replacement modules 500 stored on the medium 22(updated) along with the geographic data 40(updated). Some or all of the replacement routines 400 would be executed, as needed, by a program 402 in the navigation application 18 instead of native code routines in the navigation application 18 to access and/or use the updated geographic data 40(updated) which are provided on the medium 22(updated). In a preferred embodiment, the program 402 is a virtual CPU and the replacement routines 400 reside oil the media 22(updated) as binary machine code for the virtual CPU 402, as explained below.

In alternative embodiments, the updated storage medium 22(updated) may include both metadata tables 259 and replacement routines 400. Metadata tables 259 may be used when the changes to the data structure of the new geographic data 40(updated) on the medium 22(updated) compared to the data structure of the geographic database for which the navigation system was designed can be accommodated by relatively direct translations. Replacement routines 400 may be used when the changes in the data structures are of a scope that relatively direct translations are not sufficient or efficient.

Each storage medium upon which is stored a geographic database of a version later than an initial version may have replacement routines stored thereon. Due to the uncertainty as to the magnitude of changes that may be made over the period for which forward compatibility is desired, it is preferable to make this replacement capability as robust and flexible as possible.

When a replacement routine from the storage medium containing an updated geographic database is used to replace native code, the native code being replaced can be either the code that accesses the data from the medium or the code that uses the data. The native code being replaced may be either in one of the components 200 of the navigation application program 18 or, in an embodiment in which an interface layer 41 is used to isolate the geographic database from the components 200 of the navigational application program, the native code being replaced may be in the interface layer 41. Alternatively, replacement routines 400 may be used to replace native code both in the navigation application components 200 and in the interface layer 41. In an embodiment in which only code in the interface layer is replaced, it may be necessary to replace routines in only certain of the subsystems (e.g. queries 210, cursors 249, index management 242, decompression 244, and so on) of the interface layer 41.

B. The Metadata Engine

As mentioned above, there are numerous different types of navigation system platforms and it is expected that over the years there will be even more different types of navigational system platforms. The replacement routines 400 can be used in these various different hardware platforms because they are provided in platform-independent interpretive code. These replacement routines are not run directly by the processor 12 of the navigation system 10, but instead are run on the virtual CPU 402 (also referred to as a "metadata engine"). In order to speed execution of these replacement routines 400, the replacement routines are compiled in p-code (interpretive, pseudo-machine language) which is the machine code of the virtual CPU 402 included in the navigation program 18. Therefore, the virtual CPU 402 has the same instruction set in every navigation system platform. Then, whenever a new medium is used in an older navigation system platform, any of the functions in the navigation application program 18 which are obsolete can be replaced (i.e. substituted) with updated functions loaded from the new medium and executed by the virtual CPU 402.

The use of a virtual machine to emulate an actual computer CPU is known and various implementations of virtual machines may be suitable with the modifications indicated below. In one embodiment of the metadata engine for use in a navigation system, portions of the engine can be similar to those in the Java™ virtual machine. However, if a version similar to the Java™ virtual machine is used, it should include extensions that provide for components and functionality beyond its conventional implementation, as described below. These extensions include the ability for metadata object code to be called by C functions, the ability for the replacement routines in turn to call C functions, and other modifications as indicated below.

In a present embodiment of the metadata engine, the instruction set includes all of the arithmetic and bit-wise logical operations of C. In this embodiment, there is no type checking or validation, no classes are implemented and all references to classes are unsupported. However, included in this embodiment of the metadata engine are operations for calling C functions, manipulating C structures, and so on. Each instruction includes a single addressing mode. To implement its various operations, the metadata engine 402 is implemented internally in C using a switch statement, although other implementations may be used.

Figure 5:
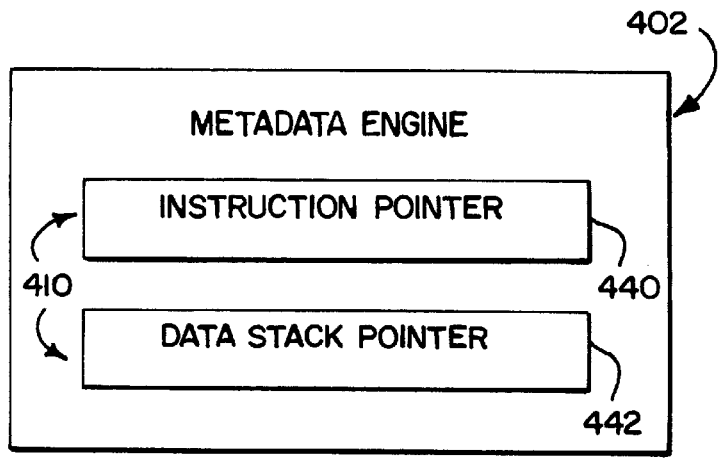
FIG. 5 is a block diagram showing portions of a first embodiment of the virtual CPU of FIGS. 3 and 4.

Referring to FIG. 5, in one embodiment, the metadata engine 402 is implemented as a stack machine. This stack machine architecture includes registers 410 for an instruction pointer 440 and a data stack pointer 442. In one embodiment, these are the only registers in the virtual CPU 402. In this embodiment of the metadata engine, the stack is 32 bits wide and is typeless. This approach provides for ease in the writing of prototype scripts for the virtual CPU. In this implementation, the metadata engine includes its own local variables and constants.

Included at page A-2 of the microfiche appendix, which is a part of the disclosure of this specification, is the source code for the metadata engine. A listing of the instructions for one embodiment of the metadata engine 402 is included at page A-43 of the microfiche appendix. The instructions include those which are similar to those in the Java™ virtual machine as well as the additional modifications and extensions.

C. Replacement Modules

As mentioned above, the replacement of portions of the native code of the navigation application 18 is accomplished by including p-code routines 400 along with an updated version of the geographic data, preferably on the same medium upon which the updated version of the geographic data is stored. These p-code routines are in an interpretive, pseudo-machine language. These routines 400 are included in separate replacement modules 500 which are stored on the medium 22(updated). Each of these modules 500 includes a small group of functions which form a single unit of compilation.

Figure 6:
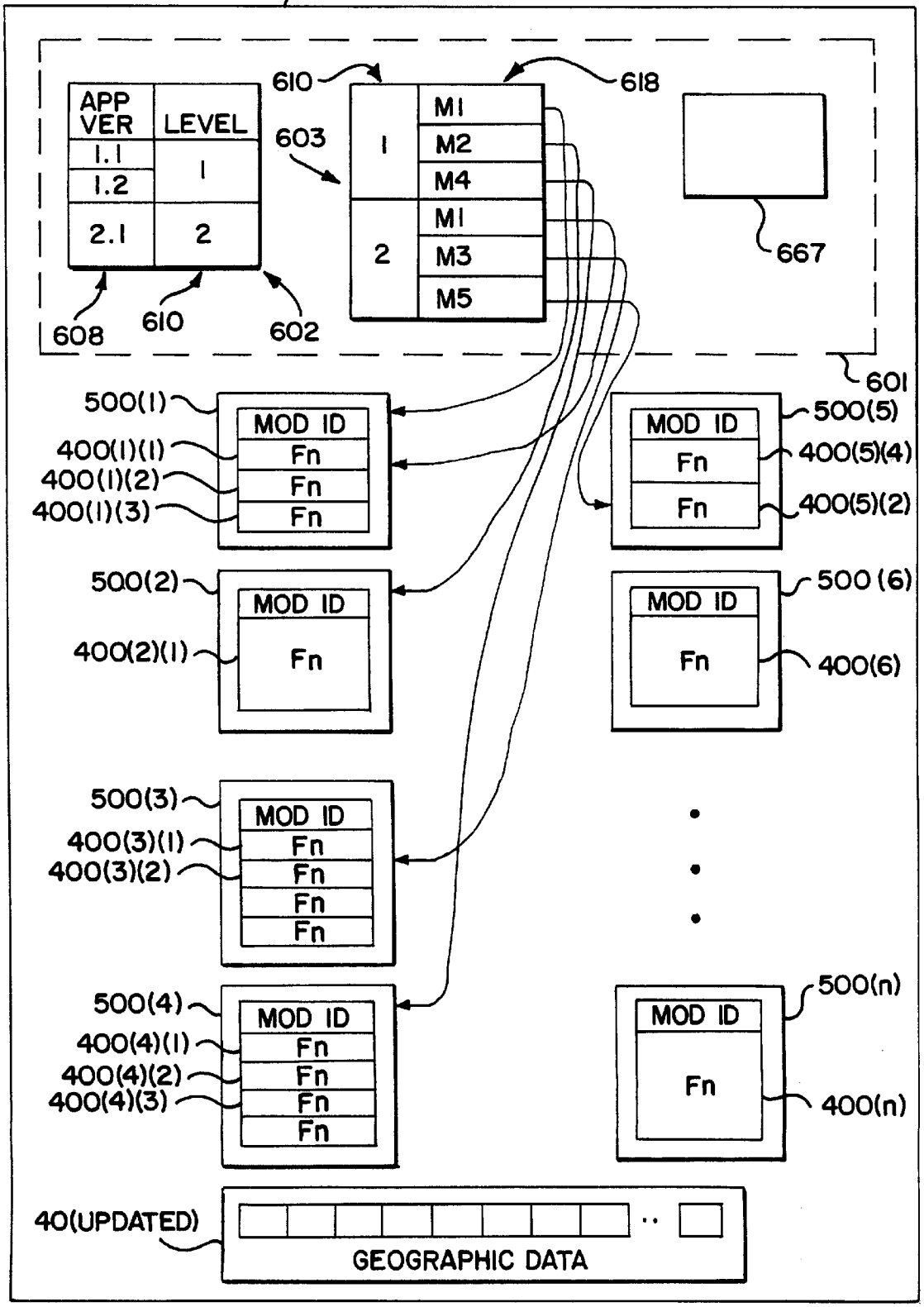
FIG. 6 is a block diagram illustrating the data stored on an updated storage medium of FIG. 4.

FIG. 6 is a diagram showing the kinds and organization of data on the medium 22(updated). On the medium 22(updated) are a plurality of replacement modules 500(1), 500(2) ... 500(n), each of which includes one or more functions, such as functions 400(1)(1), 400(1)(2), 400(1)(3) ... 400(n)(1), and so on.

Figure 7:
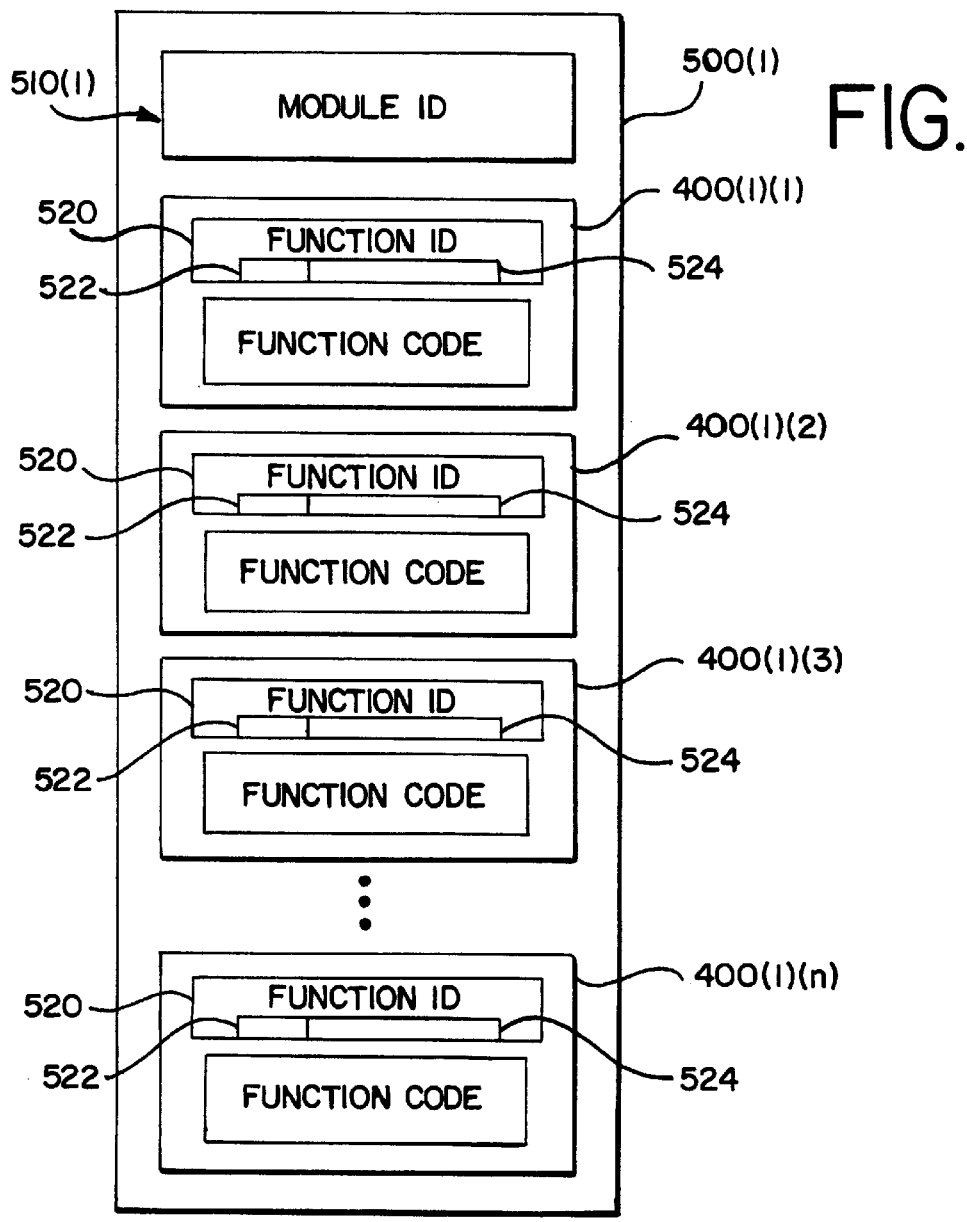
FIG. 7 is a block diagram illustrating parts of a replacement module of FIG. 6.

Module Identifiers (ID's). FIG. 7 shows additional components of the module 500(1). The other modules have similar components. In a preferred embodiment, some modules may be prepared so that all the replacement functions included in a module relate to only one type of navigation function. This enables the functions needed to perform a particular kind of navigation function to be loaded more quickly. Moreover, it allows for more efficient use of memory resources because routines not related to a particular navigation function being performed need not be loaded In order to identify the kinds of routines included in a module, each module includes a module identifier by which it is known to the metadata engine 402. Referring to FIG. 7, the module 500(1) is shown to have module identifier 510(1). The module identifiers have numeric values which have the following specific meanings:

| CATEGORY | | No. |
| --- | --- | --- |
| Cartographic functionality | MOC_CARTO | 1 |
| Routing functionality | MOC_ROUTING | 2 |
| POI functionality | MOC_POI | 3 |
| Navigable feature functionality | MOC_NAVFEAT | 4 |
| Place functionality | MOC_PLACE | 5 |
| Explication functionality | MOC_EXPLICATION | 6 |

Module identifiers 510 have numeric values defined from 0 to 65535. In a preferred embodiment, 32768–65535 are reserved for dynamically-loaded modules. If any replacement module does not fit into the above categories it uses a value above 100. These categories are used by the navigation application 18 through a configuration specification (described below) which allows the navigation application 18 to request one or more of these categories to be given priority over the others.

It is intended that the navigation application 18 will load at least the appropriate module(s) 500 to process the type of data which is being accessed. These modules contain at least part of the functionality for that function. This pre-loading of replacement modules is preferred to speed execution of the modules. When these modules 500 are loaded, they are dynamically linked with the navigation application code thus eliminating any conflicts due to inter-module references. Alternatively, all the modules may be loaded if the navigation system has sufficient memory resources.

Function Identifiers (ID's). Referring to FIG. 7, each replacement function (such as replacement function 400(1)(1)) in a module (such as module 500(1)) is identified by a function identifier (ID) 520. The function ID 520 is a number that includes two parts. A first part 522 includes the low two bits and is used to classify the function. The second part 524 includes the remaining 30 bits and is used to identify the function. These functions can be called by the functions in the library of the interface layer 41 using names in the form of the C function name prefixed by "eMe__". Metadata functions which are called internally have unique identifiers. These internally-called functions have function ID's of at least 1000.

Metadata levels. Referring again to FIG. 6, included on the storage medium 22(updated) is a global media portion 601. Included in the global media portion 601 are two arrays 602 and 603. The first array 602 associates releases 608 of the navigation application program to metadata levels 610 available on the medium.

The structure defining the first array 602 is:

```
typedef struct {
        Ushort_t        usSda1LibraryVer;
        Ushort_t        usMetadataLevel;
} MetadataLevel_t;
```

As shown in the first array 602 in FIG. 6, a medium upon which is stored updated geographic data may have more than one metadata level stored on it. In FIG. 6 the table 602 shows two metadata levels, 1 and 2, at 610. Each metadata level may be associated with one or more navigation application release versions 608. If any replacement modules for a particular navigation application release version are present on the medium, the release version of the navigation application should appear among the releases 608 listed in the first column 608 of the first array 602. If the release version of the navigation application does not appear in the array 602, the navigation application cannot use the geographic database on the medium 22(updated). This array 602 provides a degree of isolation between the database release and the navigation application release versions.

The second array 603 relates the metadata levels 610' (corresponding to the levels 610 in the first array 602) to parcel locations 618 for the various replacement modules on the medium 22(updated).

The structure defining, the second array 603 is:

```
typedef struct {
        Ushort_t usMetadataLevel;
        Ushort_t usModuleId;
        Ushort_t usModuleLength;
        Ushort_t usFlags;
        ParcelID_t moduleParcel1;
        ParcelID_t moduleParcel2;
} MetadataModule_t;
```

The usModuleId member is unique within a single metadata level.

The usModuleLength contains the actual length of data in the parcel which is being used by the replacement module.

The usFlags member contains various flags which are specified in decimal form to the metadatata engine 402. For example, one flag indicates that the replacement module should be loaded unconditionally during initialization. Other flags are defined as needed.

In a preferred embodiment, there are at least two redundant copies of each replacement function stored on the medium. Accordingly, the second array 603 identifies each of the plural locations on the medium 22 at which a copy of each function can be found. Each of these locations is identified by a parcel ID. (For further information regarding how the parcel ID can be used to locate information in a database on a medium, reference is made to the copending application Ser. No. 08/740,295, the entire disclosure of which is incorporated by reference herein.) The first parcel ID is used to refer to a location on the medium from which to load the replacement function during initialization. The second parcel ID is used to refer to a location on the medium from which to load the function if the replacement function is being loaded dynamically in response to a function call from the navigation application. Redundant copies of replacement functions at more than one location on the medium are provided to facilitate access to the functions. Because redundant copies of the functions are located at more than one location on the medium, it is more likely that the read head of the navigation system that is accessing the medium will be able to access a location at which the function is located quickly than if only a single copy of the function were provided. These redundant copies of replacement functions are provided for use in navigation systems which do not load all the replacement functions into memory at initialization.

Hash Table size. In addition to the arrays 602 and 603, also included in the global media header 601 is hash table information 667. This hash table information 667 indicates the size of and the probe value for a hash table, as described below. This information 667 is included in the value usMetadataHash. The hash table size is fixed in the database and is related to the largest number of replacement functions required by any of the navigation application release versions. In a preferred embodiment, the size of the hash table is set to be at least twice the size required to contain all of the replacement functions. The details of specifying the hash table size and probe amount are described below.

3. Methods of Producing the Metadata Engine, Replacement Modules, and Native Code Modifications A. Modification of Native Code Routines In order to enable replacement of native code in the navigation application 18 with code provided from the updated storage medium 22(updated), a means is provided in the native code to call a replacement routine and execute the replacement routine if it is available as a substitution for the native code. The code in the navigation application may call replacement functions directly, or alternatively, the code in the navigation application may call the replacement routine through a hooking technique in which the body of a native C function in the native code is replaced by a replacement routine from the medium 22(updated).

Figure 8:
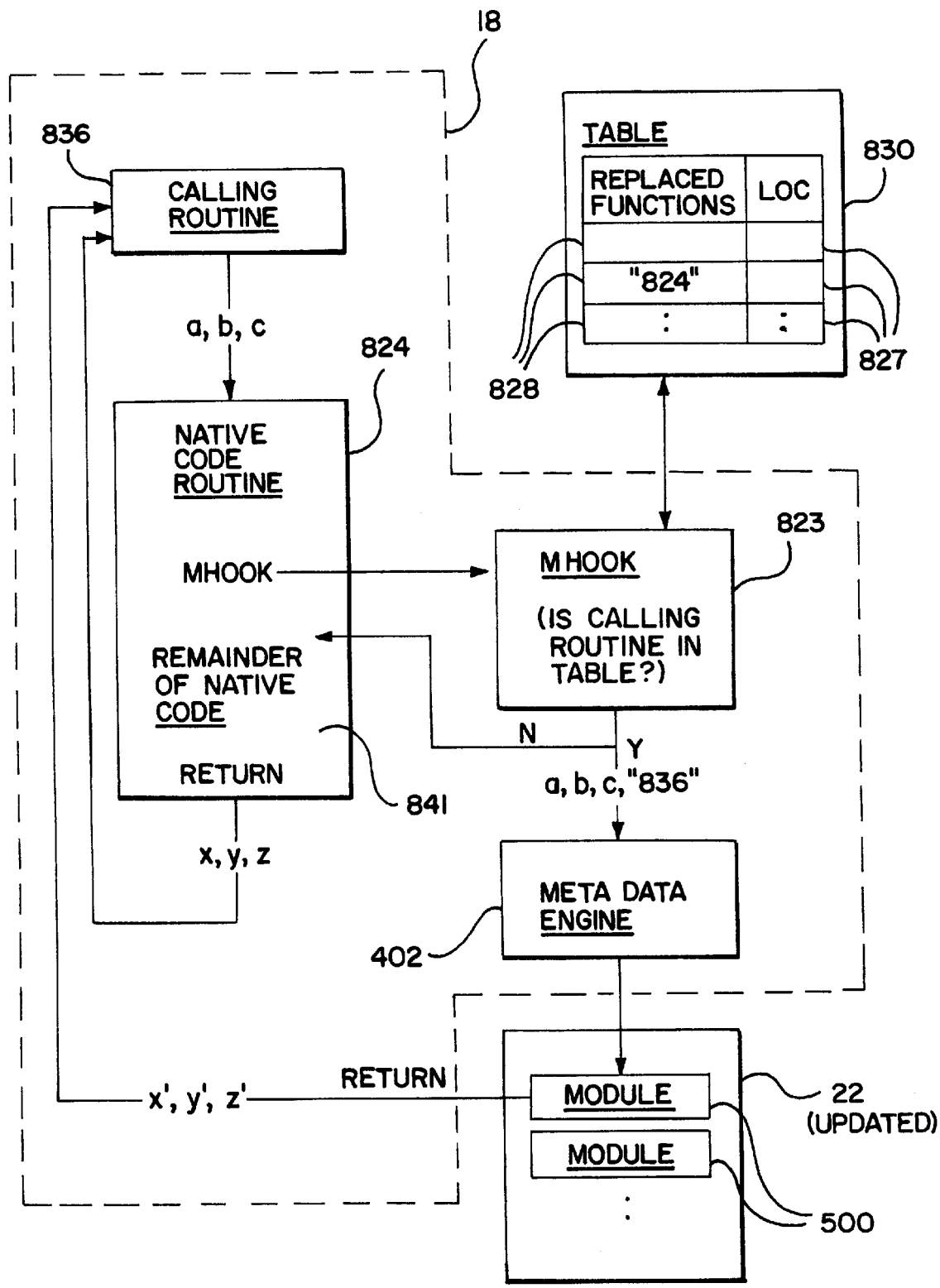
FIG. 8 is a block diagram illustrating an arrangement by which native code of the navigation application can be substituted by a replacement routine executed by the virtual CPU of FIG. 4.

FIG. 8 illustrates an embodiment of a hooking technique to replace native code of the navigation application 18. The hooking technique may be implemented to replace a function in the interface layer portion 41 of the navigation application 18 or may be implemented elsewhere in the native code of the navigation application program 18. In FIG. 8, a native code routine 824 which is subject to possible replacement by a replacement routine is called by another routine 836 which passes arguments, (a, b, c) to the routine 824 and expects to be returned values, (x, y, z). The called native code routine 824 includes a function call that calls a "hooking" function ("MHOOK") 823. The call to the hooking function 823 is included in the native code routine 824 close to the beginning of the routine 824, preferably before any steps of the routine are performed with the data. When a medium 22 upon which is stored a version of a geographic database also includes one or more replacement routines for native code routines, the availability of such replacement routines is indicated to the navigation application 18 by entries 828 in a table 830 which is set up in the memory of the navigation system at initialization. The table 830 also indicates the locations 827 of the replacement routines either in memory or on the medium. The hooking function 823 checks the entries 828 in the table 830 to determine whether any entries match the native code function ("824") that called the hooking function 823. The hooking function 823 then executes a conditional statement. If an entry 828 in the table 830 indicates the availability of a replacement routine that corresponds to the routine that called the hooking function, the replacement routine is executed. The hooking function 823 calls the metadata engine 402 instructing it to execute the replacement routine.

In one embodiment of the hooking function, when the hooking function 823 calls the metadata engine 402, it also passes to the metadata engine all the arguments, (a, b, c), that had been passed to the routine 824 that called the hooking function 823, as well as the name of the function ("836") that called the replaced routine 824. The metadata engine 402 loads the replacement function (whose location is obtained from the corresponding entry 827 in the table 830) and executes the replacement function. Upon executing the replacement routine, the values, (z', y', z') are returned to the function 836 that called the replaced native routine 824. The remainder 841 of the native code routine 824 after the call to the hooking function 823 is not executed.

In another embodiment, when the hooking function 823 calls the metadata engine 402, it does not pass any of the arguments (a, b, c) to the metadata engine. Instead, the metadata engine gets the arguments from the prior level up in the argument stack. Similarly, on return the replaced native code function 824 can be bypassed completely. Using this embodiment of the hooking function avoids the overhead of passing all the arguments to the metadata engine each time native code is replaced. Appendix B of this specification includes two versions of x86 assembler code that can be included in the metadata engine to implement getting the arguments directly from the calling function. The first is a Microsoft compiler version and the second is GNU C compiler version.

Using either of the above hooking techniques, native code of the navigation application 18 can be replaced by replacement functions provided from the storage medium. An example of how a native code function may be modified to call a hooking function is included in the microfiche appendix at page A-49. The source code for the hooking function is included in the microfiche appendix at page A-50.

In still other alternative embodiments, the native code in the navigation application can call the replacement modules directly without using the hooking technique. This latter approach may be used in later versions of navigation application programs when it is known that replacement modules are available on updated storage media and therefore need not also be included in the native code.

Referring still to FIG. 8, if the hooking function 823 does not find an entry 828 in the table 830 indicating the availability of a replacement routine, the hooking function returns to the function that called it and the remainder of the native code routine 841 continues to run as it normally would. The native code function 823 returns values (x, y, z) to the calling routine 836.

B. The Replacement Modules (1). Preparing Replacement Functions

Figure 9:
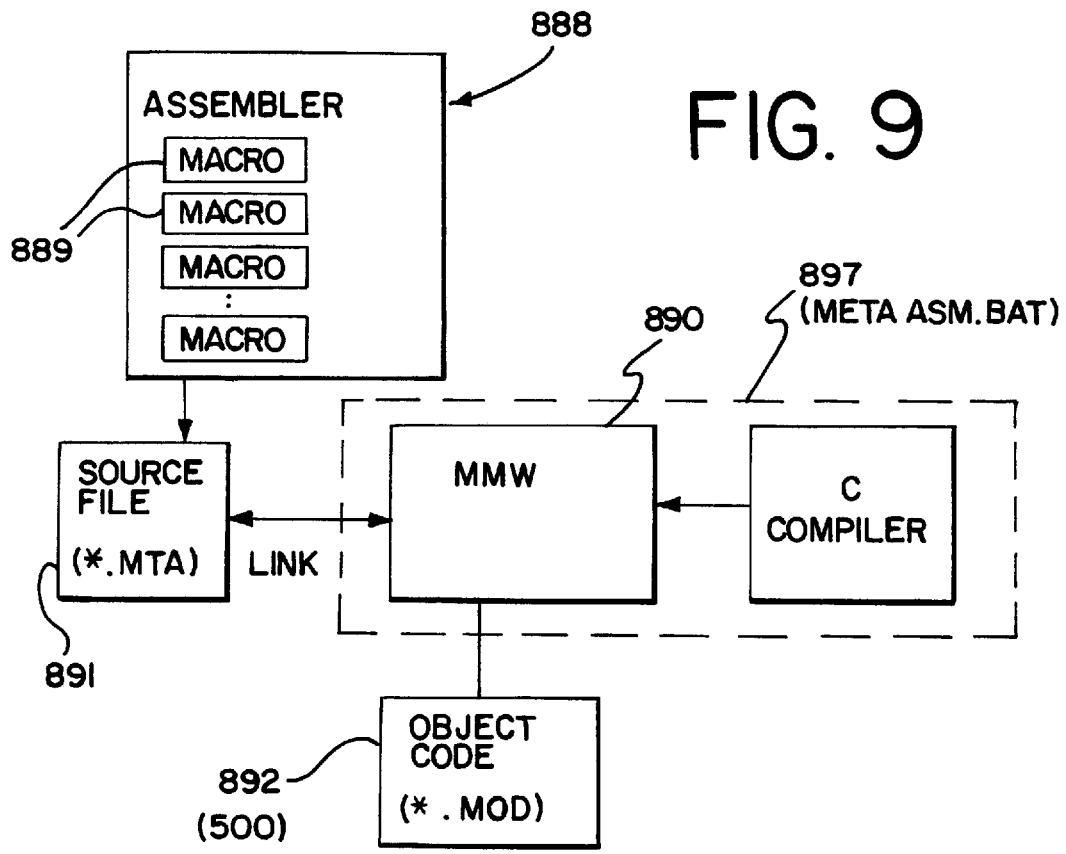
FIG. 9 is a block diagram illustrating the process for making replacement modules as shown in FIGS. 4 and 8.

Referring to FIG. 9, replacement functions are prepared using an assembler 888, and in particular an assembler based on a C compiler. The assembler 888 includes a set of C macros 889 that work in conjunction with a metadata module writer ("MMW") program 890. Metadata object code is constructed by a process whereby assembler instructions are coded using these C macros. An advantage of using the assembler 888 is its capability to reference existing C data structures. This allows use of all existing C data structures including the C data structures present in the code of the interface layer 41. The output of the assembler 888 is a program module 891 (source file). This program file 891 is the metadata assembly language source file (*.mta).

a. The MMW Program 890

The MMW program 890 is a precompiled program which is linked with the metadata source file 891 and executed. The source file 891 is linked with the MMW program 890. The MMW program 890 is then executed to produce a binary file 892 (*.mod). This binary file 892 corresponds to one module 500 to be included with the geographic database. In a present embodiment, this process is performed in the Windows environment using the MMW program 890 and a C compiler. In one embodiment the C compiler is Microsoft Windows Visual C/C++. The MMW program 890 is a precompiled program. The source code for the MMW program 890 is included in the microfiche appendix starting at page A-30.

A batch file 897 may be used to simplify the task of building metadata modules. The batch file 897 accepts a single parameter, i.e, the file name of the metadata source file 891 (without the extension), and processes the .mta source file into a .mod module file. The listing for a batch file, metaasm.bat, that can be used to perform this function is included in the microfiche appendix starling at page A-42.

b. Metadata Assembly Language

Since the input to the metadata compilation process is processed by a C compiler, the following considerations apply to the assembly language syntax. Semicolons are not required anywhere in the metadata assembly language. The specification of operands is enclosed in parentheses. For example, the instruction "bipush(12)" would be specified for the MMW 890. Labels are specified as L(label) instead of "label:". C-style comments may be used, for example enclosed in "/*" and "*/". Preprocessor definitions may be used to specify labels for local variables to facilitate readability and reduce possible confusion between local variables and constants.

The instructions which use a based pointer reference, such as ipload, use an offset into a data structure. Assuming the proper structure definitions have been included into the source file (using the preprocessor #include directive), the macro offsetof(structure,member) may be used to obtain the proper offset value. The structure is identified by the typedef or structure tag, not an actual instance of the structure itself. For example, to get the displacement of the ucNumAdminLevels in a DBCountry_t structure, one would specify offsetof(DBCountry_t,ucNumAdminLevels).

As mentioned above, each module contains one or more replacement functions. In one alternative, the modules may be made as large and as all-inclusive as possible, with the limitation that each replacement module, when compiled and stored on the medium. does not exceed 32,760 bytes in length, for the reason described below. Large, all-inclusive modules may provide better performance in some navigation systems, in particular larger systems with greater memory resources. Alternatively, the modules may be forned so that each module includes functions limited to only a single kind of function or group of functions. As mentioned above, it may be necessary to load the modules at runtime if memory is limited, as it may be in smaller systems. If a navigationi system is loading modules at runtime anyway, it is preferable then that the functions in each module be limited to a single or limited kind of functionality. This permits the memory resources of the navigation system to be managed more efficiently by discarding modules which are not in use. If space permits on the storage medium, both kinds of modules may be included.

Each replacement function in a replacement module is prefixed by StartScript(function_identifier) and ended with EndScript. At the end of the source file 891 from which the module is formed, there is a statement as follows:

Scripts={Z_firstfunction, Z_secondfunction, . . . , NULL};

This identifies each of the replacement functions which are present in the source file 891. The prefix "Z_" is applied to each function identifier to prevent conflicts with other defined names. A semicolon is required at the end of this statement. As mentioned above, the output of the compilation process is the "*.mod" file 892.

(2). Making the Module Descriptor File

As mentioned above, when replacement modules are present on an updated storage medium, the medium also includes the metadata arrays 602 and 603 and the hash table information 667 (hash table value and probe value for setting up of the hash table) in the global header information 601. The contents of the above-described arrays 602 and 603 and the hash table data 667 are supplied in ASCII form in a single module descriptor file to the compiler which forms the geographic database. A suitable compiler for forming the geographic database is described in the referenced application Ser. No. 08/740/295. In a present embodiment, the module descriptor file including the arrays 602 and 603 and the hash table data 667 is provided with the syntax set forth below. This module descriptor file then points to other binary files which are the actual replacement modules themselves.

Comment records and white space are allowed for readability in the module descriptor file. A leading "#" character indicates a comment line. Comments are not placed on other records. There are three types of records which are present in the module descriptor file: the hash table value 667, the library-metadata level correspondence table 602, and the replacement module table 603. These are presented in this order in the module descriptor file.

a. Hash Table Value Record

This record is in the following form:

hashvalue nnnnn where "hashvalue" is a numeric value ("nnnnn") from 0 to 65535 and is processed as unsigned. This value contains both the number of hash table entries and the probe amount to be used when accessing the hash table. The probe increment is the number of elements which are skipped when searching for the next hash table value. Probe increments are specified as a probe index value which selects from one of the following values:

| Index | Probe Value | Index | Probe Value |
|-------|-------------|-------|-------------|
| 0 | 1 | 8 | 43 |
| 1 | 3 | 9 | 67 |
| 2 | 5 | 10 | 83 |
| 3 | 7 | 11 | 97 |
| 4 | 11 | 12 | 127 |
| 5 | 13 | 13 | 193 |
| 6 | 17 | 14 | 251 |
| 7 | 19 | 15 | 307 |

The formula for constricting the hash value is

Value=Hash Table Size+(Probe Index* 4096)

Although the hash table can be of any specified size, in a present embodiment, the maximum hash table size is 4095 entries. Specifying a probe index which indicates a value larger than the hash table is undesirable. It is preferable that the probe value not be equal to or a large factor of the number of hash table entries. For example, a hash table size of 307 (or 614 or 921) should not be specified with a probe index value of 15. It is preferable to specify a hash table size at least 10 times greater than the probe value and to use a prime number for the hash table size. For example, for a database containing 100 replacement functions, 251 would be a suitable hash table size with a probe increment value of 19 (index 7), giving 251+7*4096 or 28923.

b. Library—Metadata Level Correspondence

This section of the module descriptor file contains zero or more correspondence records in the following form:

library MM.mm nnn where "MM.mm" represents a library major and minor version level. The "nnn" value is the metadata level which may be any value from 0 to 65535. In a preferred embodiment, all library records are together without any other intervening records.

c. Replacement Module Table

The replacement module table is the last section of the module descriptor file. Each record in the table has the following form:

module level id flags filename<parceltype> where "level" is one of the metadata levels which has been previously defined by one or more library records. This value is placed in the usMetadataLevel member.
"id" is a value from 1 to 65535 which represents the module ID. Module ID 0 is reserved for the metadata engine itself Module ID's are unique for a single metadata level. This value is placed in the usModuleId member.
"flags" is a value from 0 to 65535 which represents some combination of flag bit settings which are used by the interface layer code. These are specifically not defined to the compiler. This value is placed in the usFlags member.
"filename" specifies a fully-qualified path to the replacement module data file. This file cannot exceed 32,760 bytes in length. A parcel header is applied to it, with a parcel type of GLOBAL_MEDIA_DATA_PARCEL. The parcel size is the smallest which will contain the metadata file and the header. The length of the file, not including the parcel header, is placed in the usModuleLength member. The parcel ID first occurrence of the parcel data is placed in the moduleParcel1 member.

"<parceltype> is an optional value which may be supplied to request an additional copy of the parcel be inserted into the database. This is a value from 0 to 255 which corresponds to any parcel type defined by the compiler used to make the geographic database. The parcel in which the replacement module is placed is allocated nearby the first occurrence of the parcels of this type in the database. If this value is omitted, no additional parcel is allocated in the database. If a parcel is allocated, the parcel ID is stored in the moduleParcel2 member.

(3). Compiling the Modules on the Medium

After the replacement modules are prepared, each module to be included on an updated storage medium is contained in a single file, e.(g. file 892 (*.mod). These files 892 and the descriptor file are input to the compiler which is used to prepare the updated geographic data file. In a preferred embodiment, each replacement module, when compiled and stored on the medium, does not exceed 32,760 bytes in length. This allows a module to be contained in a single parcel including a standard 8-byte parcel header. (Padding may be added to the end of any metadata file so that it conforms to the size of a parcel. Further information regarding parcels on the storage medium is included in the referenced application Ser. No. 08/740,295.)

(4). Compiling the Metadata Engine

Figure 10:
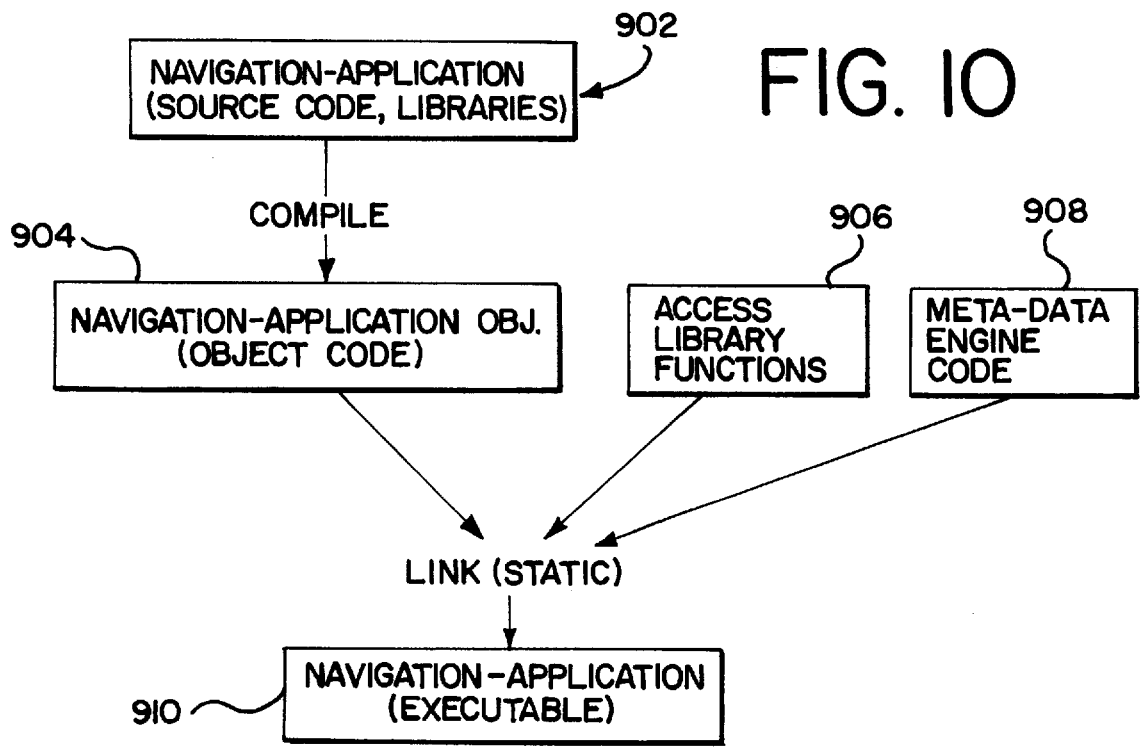
FIG. 10 is a block diagram illustrating the process for making the virtual machine of FIG. 4.

As mentioned above, the virtual CPU 402 is part of the navigation application program 18. If the navigation application 18 includes an interface layer, such as layer 41, the virtual CPU may be part of the interface layer. Regardless of whether an interface layer is used, the virtual CPU 402 may be statically linked with the navigation application components 200 to form the executable navigation application program 18. FIG. 10 is a flow chart showing a process for compiling the source code for the data access interface layer (including the virtual CPU 402) and the navigation application components 200 to form the executable module that forms the navigation application program 118. In a preferred embodiment, the source code for the navigation application components is written and saved as libraries of source code functions 902. These libraries are compiled to form an object code module 904 for the navigation application components. This object code is then statically linked with the source code 906 for the interface library functions as well as the source code 908 for the metadata engine 402 to form an executable module 910 (corresponding to navigation application 18) which is specific to a particular navigation system platform. The executable module 910 may be installed on the navigation system platform in various ways. For example, the executable module may be copied from an additional drive slot or may be pre-installed into some form of non-volatile memory in the navigation system.

4. Operation

A. General

In general, there are two ways in which a navigation system can use replacement modules. A first way is to have the navigation system load all the replacement modules that are applicable to its particular version of navigation application program into memory at initialization. A second way in which a navigation system can use replacement modules is to have the navigation system selectively load into memory during runtime only those replacement modules that will be needed in order to access and use a particular type of data to perform a specific kind of function as the function is going to be performed.

Loading all the applicable modules at initialization is preferred for performance reasons because it avoids the need to locate and read the replacement modules from the storage medium during runtime which may result in slower performance. However, loading all the applicable replacement modules at initialization may not be possible because the amount of memory required for the replacement modules may exceed the available RAM allocated for this purpose by the navigation system. If the navigation system does not have sufficient RAM to load all the applicable replacement modules at initialization, the second approach described above is used. If this second approach is used, it preferred that all of the replacement modules related to one particular type of navigation task, such as route calculation, map display, maneuver generation, and so on, reside in memory at once.

In a preferred embodiment, the navigation system has the capability of using, either approach. Regardless of the amount of memory resources of a navigation system, because the extent of replacement functions applicable to a particular future version release is not known in advance, it is possible that the memory requirements of the replacement modules may exceed the available resources of the navigation system. Therefore, it is preferable that the navigation application provide for this possibility. Moreover, the extent to which native functions are replaced with replacement functions is likely to increase over time as more native functions need to be replaced due to the cumulative changes to the structure of the geographic database. Accordingly, although it is preferable that a navigation application be able to load all applicable replacement modules at initialization if enough memory is available, it is also preferable that the navigation application have the capability to resort to loading replacement modules as needed during runtime if the RAM needed for replacement modules exceeds the available RAM provided by the navigation system.

Optimization and Configuration

In a preferred embodiment, the navigation application 18 provides configuration information that indicates how the navigation system will use the replacement modules. There are at least two kinds of configuration information that the navigation application 18 can specify: (1) specification of a RAM target, and (2) specification of functional categories to be optimized. Both of these specifications are optional.

The navigation application, through a configuration structure, specifies an amount of RAM available for replacement function use. If an interface layer is used, this amount of memory may be taken from the private memory heap used by the interface layer. This value is used as a guide to determine when one or more modules are to be loaded from the medium. In a preferred embodiment, the navigation application allocates some additional amount of heap memory (beyond any requirements for the interface layer) and specifies this amount as the RAM target for replacement functions.

In addition, in a preferred embodiment, the navigation application 18 specifies that certain functional categories are to be optimized. A table in a data structure (DBOptimize_t) includes the following bitfields:

| | |
|---|---|
| bOptCarto | When true indicates that cartographic functionality should be optimized. |
| BOptRouting | When true indicates that routing functionality should be optimized. |
| BOptPOI | When true indicates that POI (point of interest) access functionality should be optimized. |
| BOptNavFeat | When true indicates that navigable feature (i.e. names of roads) functionality should be optimized. |
| BOptPlace | When true indicates that place (i.e., names of places) functionality should be optimized. |
| BOptExplication | When true indicates that explication (i.e. maneuvering directions) functionality (mostly access to block record data) should be optimized. |

In a preferred embodiment, the navigation application 18 selects one or more of the functional categories in the above table for system optimization. This system optimization can be used if all the replacement modules applicable to the particular navigation application version are not loaded at initialization and instead modules are loaded as needed during runtime. As memory resources of the navigation system become available during runtime and are not otherwise needed for performing a task related to one of the above functional categories, replacement modules which are classified as being related to the optimized functional categories (s) are loaded into memory. Then, if the end-user selects the task to which the optimized category relates, the replacement modules needed for the task are already loaded into memory. This optimization technique increases the likelihood that the optimized task can be executed quickly without the need to locate and load the needed replacement modules from the storage medium. As mentioned above, the module ID's 510 (in FIG. 6) are chosen to identify the functional categories to which the functions included in the modules relate, and therefore can be used by the navigation application to pre-load modules which relate to the optimized task. By using, the module ID's, the navigation application can optimize which functional category of modules to make resident in memory or discard from memory when not needed.

B. Operation at Initialization

In a preferred embodiment, when the navigation system 10 is turned on, the navigation application 18 performs an initialization procedure. In addition to any other suitable functions, the initialization procedure reads the header data 601 (FIG. 6) on the medium 22 in the drive (FIG. 1) and compares its own version (the version of the navigation system 18) to the listing of versions 608 in the table 602 in the header 601. If it finds a match, the initialization procedure reads the table 603 to find the locations of the appropriate replacement modules on the medium 22 that correspond to the metadata level. If the amount of RAM needed for the applicable replacement functions does not exceed the amount of RAM specified by the navigation application for use by replacement functions, all the applicable replacement functions are loaded into memory at initialization. Otherwise, only those replacement functions which are required to be loaded at initialization or that are specified for optimization are loaded. In addition, the initialization procedure sets up the table 830 (FIG. 8) in memory to indicate the availability of the replacement functions and the addresses of the modules where the replacement functions can be located.

C. Operations During Runtime

Referring again to FIG. 8, at runtime, each native code function 824 which has been written so as to allow replacement will, just after its entry point, check the table 830 in global data to see if a replacement function is available, and if so whether the replacement function has been loaded. If the replacement module in which the replacement function is contained is not already in memory, the replacement module will be loaded at this time. The address of the replacement module on the medium will be obtained and the replacement module loaded. Procedures for loading modules are the same as those for loading parcels. Procedures for loading parcels are included in the aforementioned co-pending applications. With the replacement module in memory, the metadata engine 402 is invoked with a pointer to the code of the replacement routine. The metadata engine then runs the replacement routine. After execution, the metadata engine 402 returns to its caller, which then returns whatever has been passed back from the metadata engine 402.

To facilitate the process in which one replacement function calls other replacement functions, each function ID in the metadata code is replaced by an index/offset value when the function is called the first time. This eliminates the need to use the hash table lookup for subsequent calls from that location. FIG. 11 illustrates the how function ID's 520 and index/offset values 521 are used to access and use replacement functions. Referring to FIG. 11, each metadata function ID 520 which is used for an internal call is replaced by a module index and offset value 521 after its first use. A table 530 can be used for this purpose. To distinguish between a function ID and one which has been replaced by a module index and offset 521 the low-order bit of all function ID's is set to an arbitrary number, such as "1." Resolution of a function ID then involves a two step process in which the module index and offset into the module 521 are first acquired and then a pointer 533 to the module is obtained from the module table 534. This is done for functions which are known to exist in some metadata module. To determine if a function ID refers to a function which exists, a bitmap with a bit to represent each function which is present in the geographic database is examined. This bitmap is constructed dynamically (e.g., in conjunction with table 830) at initialization when replacement modules are present on the medium being used by the navigation application.

D. Operation at Releasing

As mentioned, in a preferred embodiment, the metadata engine 402 is a function within the navigation application program 18. It is present in memory when called by the native code of the navigation application and exits memory when it returns. All of its registers, stacks, and temporary variables are allocated as auto variables. Therefore, it is re-entrant. Multiple instances of the metadata engine 402 may exist simultaneously and independently in a multitasking environment.

In systems in which all the applicable replacement modules are not loaded into memory at initialization, the modules may be released from memory when the functions contained in the modules are not needed for an immediate navigation task. During the execution of a function in a module, that module is marked as "in use" and cannot be discarded. Each calling function increments an "in use" count maintained for the replacement function. When the "in-use" counts for all the replacement functions in a module are zero, the module may be removed from memory to make room for other modules.

To reduce the likelihood that a replacement module is discarded when it still might be needed, a LRU (least recently used) stack is used to track module usage. Only the least-recently-used module is discarded when a module is loaded into memory from the medium when the RAM target (if one has been specified by the navigation application) has been exceeded.

5. Alternative Embodiments

As mentioned above, the metadata engine is preferably implemented as a stack machine although in alternative embodiments, an emulation of a conventional CPU architecture may be used.

Alternative embodiments may be used in portable navigation systems that are not installed in vehicles, such as hand-held systems, or systems installed on portable personal computers or personal digital assistants. Further alternative embodiments may be used in non-portable systems, such as in systems used for truck fleets or traffic control. Server-based systems are also included, in which the geographic database is located on a server and client applications access the server to obtain navigation information. The server may be accessible over the Internet or over other types of networks. The server may communicate with the client applications via wireless transmission. Various other platforms and/or systems are possible.

In the above described embodiments, the replacement routines are indicated as being included on the same medium as that upon which the updated geographic database is stored. In alternative embodiments, the replacement routines may be stored on a different medium than the one upon which the updated geographic data are stored. Alternatively, the replacement routines may be downloaded as needed. for example, via wireless transmission.

In some of the above alternative embodiments, it was described how modules including replacement routines may be included on new media that included new copies of the geographic database. In alternative embodiments, the replacement routines may be provided in a different manner. For example, some navigation systems may have the geographic database included on a rewritable media, such as a PCMCIA card, a hard disk, or a rewritable CD. If the media is rewritable, the replacement modules may be provided to the end user without replacing the old media. If the user has a rewritable media, the replacement modules may be provided to the user by any suitable means, including wireless transmission, installation disks, downloading via modem, or by having the user bring the navigation system or at least the rewritable media to a service facility.

Under some circumstances, replacement modules may be provided to an end user separate from the provision of updated geographic content. For example, replacement routines may be used to provide the end user with an upgrade for the user's navigation application program, to provide more features in the navigation application program, or to fix bugs.

In further alternative embodiments, the replacement routines may be provided in connection with incremental updates of the geographic database. As mentioned above, under some circumstances, the entire old version of the geographic database may not be replaced with a complete new version, but instead, one or more separate update files may be provided that include only the changes to the geographic database since the old version. Replacement modules may be used in connection with this kind of geographic update as well.

In still further embodiments, the replacement modules may be provided to users even when the geographic database is not stored on a media in the possession of the end user. For example, the end user may access the geographic database from a remote location. Under such circumstances, replacement modules may be provided to the end user to be used by the end user even if the geographic database is being accessed from a remote location.

It is intended that the foregoing detailed description be regarded as illustrative rather than limiting and that it is understood that the following claims including all equivalents are intended to define the scope of the invention.

APPENDIX B
ASSEMBLER CODE FOR
IMPLEMENTING OPTIMIZED METDATA ENGINE

```
MICROSOFT COMPILER VERSION
/* meoptret.h
In-line Assembly for Microsoft Compiler to return skipping one stack
level.
Copyright (c) 1997 by Navigation Technologies Corporation.
All Rights Reserved. All title and intellectual property rights to the
software shall remain with Navigation Technologies Corporation. Any
unauthorized reproduction or use will be prosecuted. */
    _asm  mov    ecx,[ArgCount]
    _asm  shl    ecx,2
    _asm  mov    eax,Temp
    _asm  pop    edi
    _asm  pop    esi
    _asm  pop    ebx
    _asm  mov    esp,ebp
    _asm  pop    ebp
#ifdef_DEBUG
    _asm  mov    esp,ebp
    _asm  pop    ebp
    _asm  pop    edx
    _asm  add    esp,ecx
    _asm  push   edx
#else
    _asm  mov    edx,[esp+0]
    _asm  cmp    byte ptr [edx+3],0xc3
    _asm  je     $+9
    _asm  add    esp,8*4
#endif
    _asm  ret
/*meoptarg.h
In-line Assembly for Microsoft Compiler to return skipping one stack
level.
Copyright (c) 1997 by Navigation Technologies Corporation.
All Rights Reserved. All title and intellectual property rights to the
software shall remain with Navigation Technologies Corporation. Any
unauthorized reproduction or use will be prosecuted. */
    _asm  xor    ecx,ecx;            /* clear reg */
    _asm  mov    eax,[IP];           /* get current instruction ptr */
    _asm  mov    cl,byte ptr [eax];  /* get number of args */
    _asm  or     cl,cl;              /* anything to move? */
    _asm  jz     skipmove;           /* no, skip moving */
#ifdef_DEBUG
    _asm  mov    eax,[ebp];          /* Get ptr to prior stack frame */
    _asm  lea    esi,[eax+8];        /* point to 1st argument */
#else
    _asm  lea    esi,40[ebp]         /* point to 1st argument */
#endif
    _asm  mov    edi,[Vars];         /* point to local variable begin */
    _asm  repnz  movsd;              /* move arguments to local
variables */
skipmove:
GNU C COMPILER VERSION
/* meoptret.h
In-line Assembly for VxWorks to return skipping one stack level.
Copyright (c) 1997 by Navigation Technologies Corporation.
All Rights Reserved. All title and intellectual property rights to the
software shall remain with Navigation Technologies Corporation. Any
unauthorized reproduction or use will be prosecuted. */
asm("shl    2,%ecx": "%ec"(iArgCount), "%eax"(Temp));
asm("pop    %edi");
asm("pop    %esi");
asm("pop    %ebx");
asm("mov    %ebp,%esp");
asm("pop    %ebp");
asm("mov    %ebp,%esp");
asm("pop    %ebp");
asm("pop    %edx");
asm("add    %ecx,%esp");
asm("push   %edx");
asm("ret");
```

-continued

APPENDIX B
ASSEMBLER CODE FOR
IMPLEMENTING OPTIMIZED METDATA ENGINE

```
/*meoptarg.h
In-line assembler for VxWorks argument collection.
Copyright (c) 1997 by Navigation Technologies Corporation.
All Rights Reserved. All title and intellectual property rights to the
software shall remain with Navigation Technologies Corporation. Any
unauthorized reproduction or use will be prosecuted. */
asm("xorl    %ecx,%ecx": "%ecx");
asm("movb    %eax, %cl": "%ecx": "%eax" (IP));
asm("ori     %cl,%cl");
asm("jz      0f");
asm("movl    (%ebp),%eax");
asm("leal    %esi,(%eax(8))");
asm("repnz\n\tmovesl": "%edi"(Vars));
asm("0f:");
```

We claim:

1. In combination:
   a computer-based navigation system including a processor and a navigation application program run on the processor, said navigation application program including programming code to provide navigation features including use of a geographic database stored on a medium, wherein said navigation application program is at a first version level, an improvement comprising:
   at least one replacement routine, wherein said replacement routine is at a second version level, wherein said second version level is later than said first version level, and wherein said at least one replacement routine at said second version level is called by said navigation application program at said first version level and executed to use an updated geographic database stored on an updated medium to perform part of said features of said navigation application program.

2. The invention of claim 1 further comprising:
   a virtual CPU implemented as a software program routine, said virtual CPU included in said navigation application program, and wherein said virtual CPU executes said at least one replacement routine.

3. The invention of claim 2 wherein said at least one replacement routine is provided in an interpretive computer language, wherein said interpretive computer language is a machine language of the virtual CPU.

4. The invention of claim 1 wherein said at least one replacement routine is written in an interpretive computer language.

5. The invention of claim 1 wherein said at least one replacement routine is stored on said medium in one of a plurality of replacement modules, each of said plurality of replacement modules including at least one replacement routine.

6. The invention of claim 1 wherein said at least one replacement routine is called by a native routine in said navigation application program, wherein said native routine is written in a computer language of said navigation application program and when said replacement routine is executed substitutes for the remainder of the native routine.

7. The invention of claim 1 wherein said medium is a CD-ROM disk.

8. In combination:
   a computer-based navigation system including a processor and a navigation application program run on the processor, said navigation application program including programming code that provides functionality including using a geographic database stored on a medium to provide navigation features, wherein said navigation application program is at a first version level, an improvement comprising:

a plurality of replacement modules, each of said replacement modules including at least one replacement routine, wherein each replacement routine is at a version level which is later than said first version level, and wherein at least one of said replacement modules is loaded by said navigation application program to run at least one replacement routine contained therein to perform part of the functionality of said navigation application.

9. The invention of claim 8 further comprising:

a virtual CPU comprising a software routine included in said navigational application program and operable to execute said at least one replacement routine.

10. The invention of claim 8 wherein each of said replacement routines is associated with a particular kind of navigation task.

11. The invention of claim 8 wherein all the replacement routines in a replacement module are associated with a particular kind of navigation task.

12. A method of providing updating geographic data content for navigation systems comprising:

providing updated geographic data content in a geographic database at a version level subsequent to an initial version level;

providing replacement routines in interpretive computer language with copies of said geographic database; and in each of said navigation systems, operating a virtual CPU in said navigation system to execute said replacement routines to access said updated geographic data content in said geographic database.

13. The method of claim 12 further comprising the step of:

in each of said navigation systems, setting up a table in memory at initialization to indicate availability of replacement routines;

in native code routines in each of said navigation systems referencing said table to determine whether a replacement routine has been provided; and if a replacement routine has been provided executing said virtual CPU to run said replacement routine.

14. A method of operating a navigation system comprising:

running a navigation application program in the navigation system, wherein said navigation application program calls routines written in a computer language native to said navigation application program to use geographic data;

with said routines written in a computer language native to said navigation application program, accessing said geographic data from a database stored on a medium installed in said navigation system for use by said navigation application program;

replacing said geographic data with updated geographic data content in an updated geographic data structure;

loading replacement routines provided with said updated geographic data content; and running said navigation application program to call said replacement routines instead of said routines written in said computer language native to said navigation application program to use said updated geographic data content in said updated geographic data structure.

15. The method of claim 14 wherein said step of loading replacement routines is performed during an initialization step and wherein all replacement routines applicable to the navigation application program are loaded into memory of the navigation system.

16. The method of claim 14 wherein said step of loading replacement routines is performed during runtime and wherein only those replacement routines applicable to a particular navigation task being performed are loaded into memory of the navigation application.

17. An updated geographic data product comprising:

a computer readable medium;

a geographic database stored on said computer readable medium, said geographic database having updated content and an updated data structure, said geographic database being at a release version level later than an initial version level; and a plurality of replacement routines stored on said computer readable medium, said plurality of replacement routines being written in an interpretive computer language and adapted to replace routines in navigation applications of version levels earlier than said release version level.

18. The invention of claim 17 wherein said plurality of replacement routines are arranged in a plurality of replacement modules on said storage medium, wherein each of said plurality of replacement modules includes at least one replacement routine.

19. The invention of claim 17 further comprising:

at least one table stored on said computer-readable medium and relating a listing of replacement routines stored on said computer-readable medium with release version levels of navigation applications to which said replacement routines apply.

20. The invention of claim 17 wherein said plurality of replacement routines are organized into a plurality of replacement modules on said medium, wherein each replacement module includes at least one replacement routine and wherein each replacement module occupies a portion of memory no greater than 32,760 bytes.

21. In combination:

a computer-based navigation system including a processor and a navigation application program run on the processor, said navigation application program including programming code that provides navigation features and that accesses and uses a geographic database stored on a medium to provide said navigation features, wherein said navigation application program is at a first version level, an improvement comprising:

a conditional statement executed from each of a plurality of native routines that form part of said navigation application program, said conditional statement operative to check for a replacement routine and execute said replacement routine, if available;

a plurality of replacement routines accessible to said navigation application program during runtime, said replacement routines operative to use geographic data in an updated geographic data structure at an updated version level and provide updated geographic data content to a navigation application program in a corresponding version level earlier than said updated version level; and a geographic database at said updated version level accessible to said navigation application program.

22. The invention of claim 21 wherein said plurality of native routines are included in an interface layer that is linked to a remaining portion of said navigation application program.

* * * * *